(12) United States Patent
Lew et al.

(10) Patent No.: US 6,193,061 B1
(45) Date of Patent: Feb. 27, 2001

(54) DISC HOLDER

(75) Inventors: Gene Lew, Markham; Philip Dewhurst, Scarborough, both of (CA)

(73) Assignee: Diskjocki, Pickering (CA)

( * ) Notice: Subject to any disclaimer, the term of this patent is extended or adjusted under 35 U.S.C. 154(b) by 0 days.

(21) Appl. No.: 09/293,156

(22) Filed: Apr. 16, 1999

(51) Int. Cl.$^7$ .................................................. B65D 85/57
(52) U.S. Cl. ...................... 206/308.1; 206/313; 206/232; 312/9.58
(58) Field of Search ................................ 206/307, 307.1, 206/308.1, 308.3, 309, 310, 311, 312, 313, 232; 312/9.41, 9.45, 9.58

(56) References Cited

U.S. PATENT DOCUMENTS

| | | | |
|---|---|---|---|
| 4,875,743 | * | 10/1989 | Gelardi et al. ........................ 206/309 |
| 5,099,995 | * | 3/1992 | Karakane et al. .................... 206/309 |
| 5,332,086 | * | 7/1994 | Chuang ................................ 312/9.58 |
| 5,425,451 | * | 6/1995 | Blase ................................... 206/313 |
| 5,617,950 | * | 4/1997 | Chung ................................. 206/308.1 |
| 5,720,386 | * | 2/1998 | Allsop et al. ........................ 206/313 |
| 5,779,037 | * | 7/1998 | D'Agaro et al. .................... 206/308.1 |
| 5,833,067 | * | 11/1998 | Joshi ................................... 206/711 |

* cited by examiner

*Primary Examiner*—David T. Fidei
*Assistant Examiner*—Jila Mohandesi
(74) *Attorney, Agent, or Firm*—Jones & Askew LLP

(57) ABSTRACT

The present invention relates to an indexed storage cradle system for compact discs comprising a series of storage cradles rotatably mounted in parallel in a housing. Each cradle consists of a base having generally parallel vertically upstanding side walls, a rear wall and a vertical upstanding front wall. One of said side walls is higher than the other to act as a guide when inserting the disc into the slot formed between the two side walls. Means are provided on each of said side walls to keep the disc centered when fully inserted into the cradle. The top of the front wall of each cradle is provided with a cutout portion and a tab is provided either on the bottom or the top of said cutout to facilitate pulling down the cradle and the location of the tab alternates on adjacent cradles to minimize the chance of inadvertently pulling down the adjacent cradle.

18 Claims, 5 Drawing Sheets

DISC HOLDER

BACKGROUND OF THE INVENTION

1. Field of the Invention

This invention relates to an indexing, storage and retrieval system for any compact audio or video disc size medium which includes CD-ROM, CD-G, CD VIDEO DISCS, AUDIO CDs, KARAOKE CDs, AND DVDs.

2. Description of the Prior Art

In the past the professional entertainers who provide music and video using the digital compact disc format (disk jockey or DJ) had to provide some makeshift method of filing and retrieving a particular compact disc that could easily be out of order. This would entail sorting through a selection of discs to locate the desired disc. Once the disc was located, the DJ then had to open the cover or lid of the storage device to determine the track the desired selection was recorded. Often the inserts in the container that listed the song titles are misplaced, causing the DJ to be unorganized and fumbling for another disc while trying to locate the information on the misplaced insert.

There are numerous storage units on the market for personal use into which the plastic storage case for the compact disc can be inserted. There also is a home unit available through a television promotion that only holds a limited number of discs (up to 40 compact discs) in a series of thin plastic cradles. The problems with this previous unit are (1) that it is manufactured from very thin plastic, and is not precision made for the discs to be returned into the unit (2) the discs can contact the adjacent disc when retrieving and retracting the discs therefore making it possible to damage the stored discs with scratches (3) the operator would have a very difficult time especially in low light conditions to place the disc back in the very narrow slot (4) there are no guides for the disc to retract into the closed position and if one disc is out of alignment, the unit will not close and (5) there are also no means of transportation for the disc holder as it is only six inches wide and five inches deep with no handle for ease of carrying.

The present invention solves these problems so that when DJs are providing entertainment for their audiences, they have easy access to any disc in an indexed storage cradle system.

SUMMARY OF THE INVENTION

It is an object of the invention to provide an improved storage cradle for compact discs in which it is easy to return the disc into the slot.

It is another object of the invention to provide an improved storage cradle for compact discs adapted to keep the disc centered when fully inserted into the cradle.

It is another object of the invention to provide an improved jewel case utilizing the storage cradle of the present invention.

It is a further object of the invention to provide an indexed storage cradle system for individual indexed cradles so that the operator can store and retrieve any compact disc without touching the laser readable surface of the compact disc.

It is a further object of the invention to provide an indexed storage cradle system for individual indexed cradles so that the person using this system will be able to open any individual cradle without inadvertently pulling down the adjacent cradle.

Thus in accordance with the present invention there is provided an improved storage cradle for compact discs. The cradle consists of a base having generally parallel vertically upstanding side walls, a rear wall and a vertical upstanding front wall. One of said side walls is higher than the other it is easy to return the disc into the slot formed between the two side walls. Means are provided on each of said side walls to keep the disc centered when fully inserted into the cradle.

In accordance with another embodiment of the present invention there is provided an improved jewel case for compact discs. The jewel case consists of the storage cradle of the present invention pivotally mounted within a generally rectangular housing sized to accept a compact disc or the like. The cradle is pivotally mounted within said housing so that the cradle, containing the compact disc, can be pivoted out of the housing to remove or insert the disc into the cradle then pivot back into the housing to store the disc.

In accordance with another embodiment of the present invention there is provided an indexed storage cradle system for individual indexed cradles so that the person using this system will be able to open any individual cradle without inadvertently pulling down the adjacent cradle. Each cradle consists of a base having generally parallel vertically upstanding side walls, a rear wall and a vertical upstanding front wall. One of said side walls is higher than the other it is easy to return the disc into the slot formed between the two side walls. Means are provided on each of said side walls to keep the disc centered when fully inserted into the cradle. The top of the front wall of each cradle is provided with a cutout portion. A tab is provided either on the bottom or the top of said cutout to facilitate pulling down the cradle. The location of the tab alternates on adjacent cradles to minimize the chance of inadvertently pulling down the adjacent cradle.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying photographs and drawings, in which.

DETAILED DESCRIPTION OF THE PREFERRED EMBODIMENT

Figure 1:
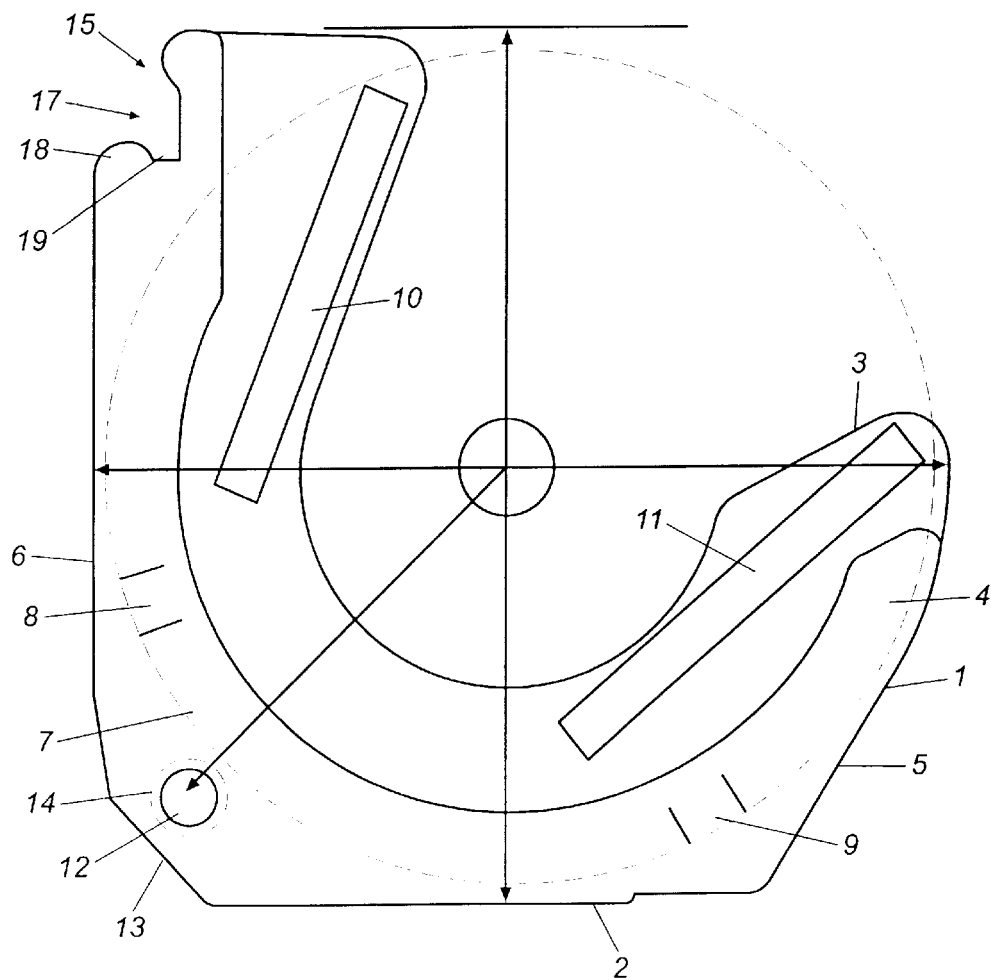
FIG. 1 is a lateral plan view of one embodiment of the cradles according to the present invention shown in Photographs 1 and 2.
Figure 2:
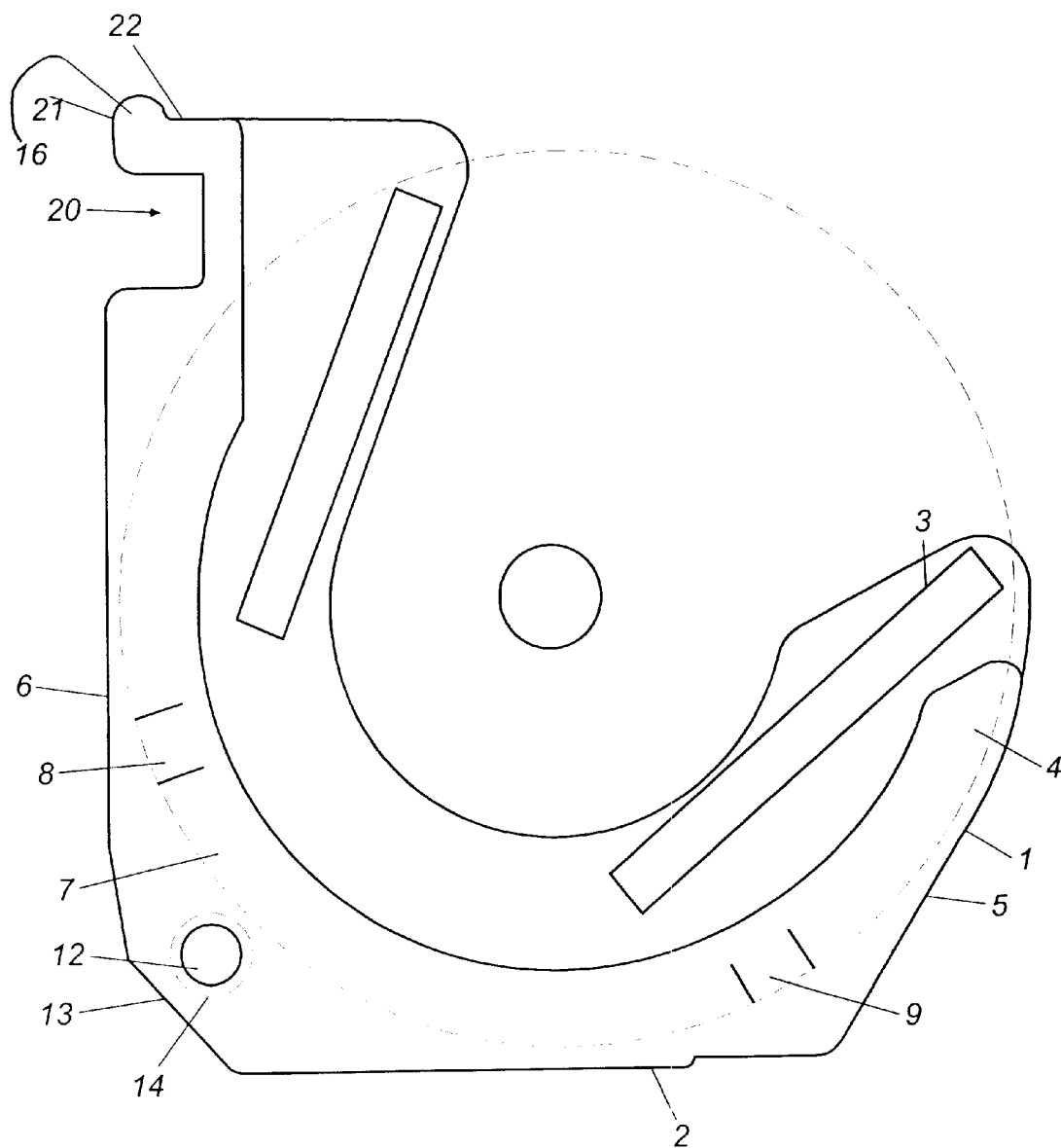
FIG. 2 is a lateral plan view of a second embodiment of the cradles according to the present invention shown in Photographs 1 and 2.
Figure 3:
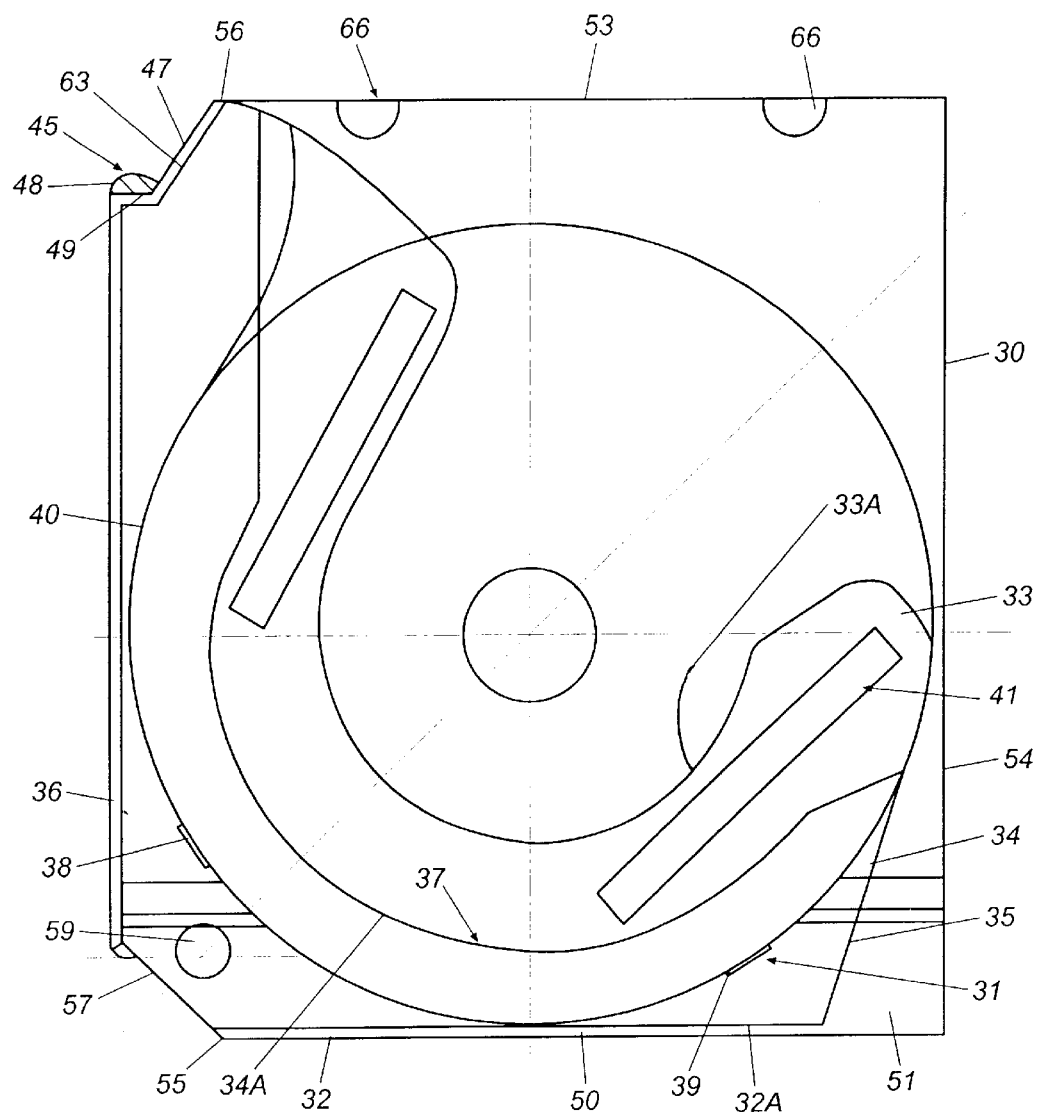
FIG. 3 is a lateral plan view of a jewel case having a storage cradle of the present invention pivotally mounted within the jewel case.
Figure 4:
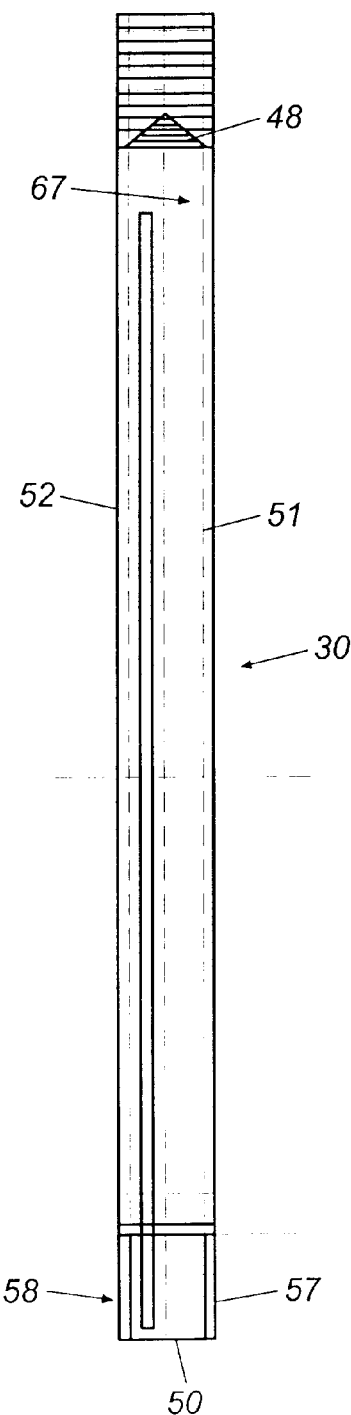
FIG. 4 is a front plan view of the jewel case of FIG. 3.
Figure 5:
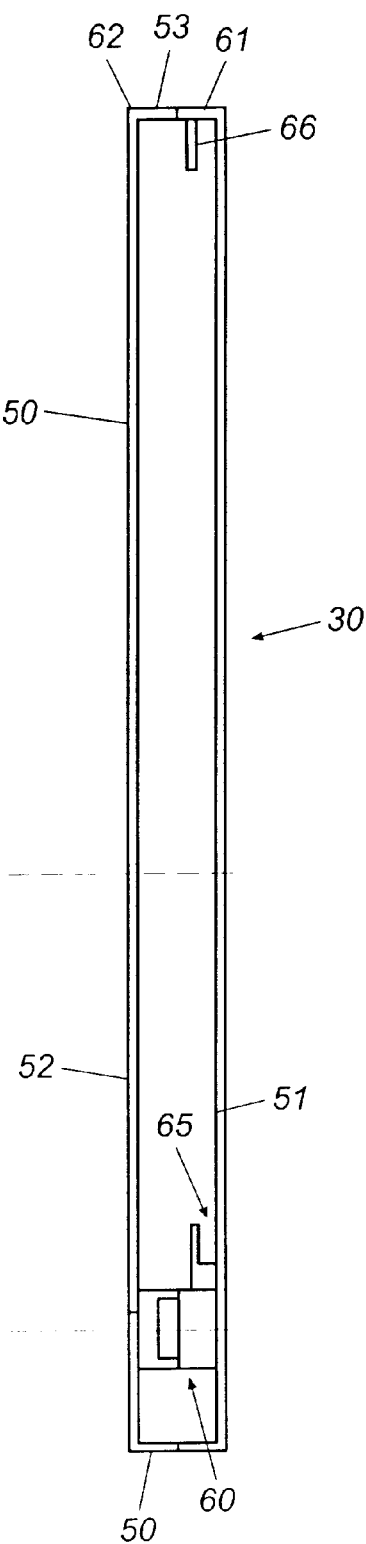
FIG. 5 is a front plan view of the jewel case housing.
Figure 6:
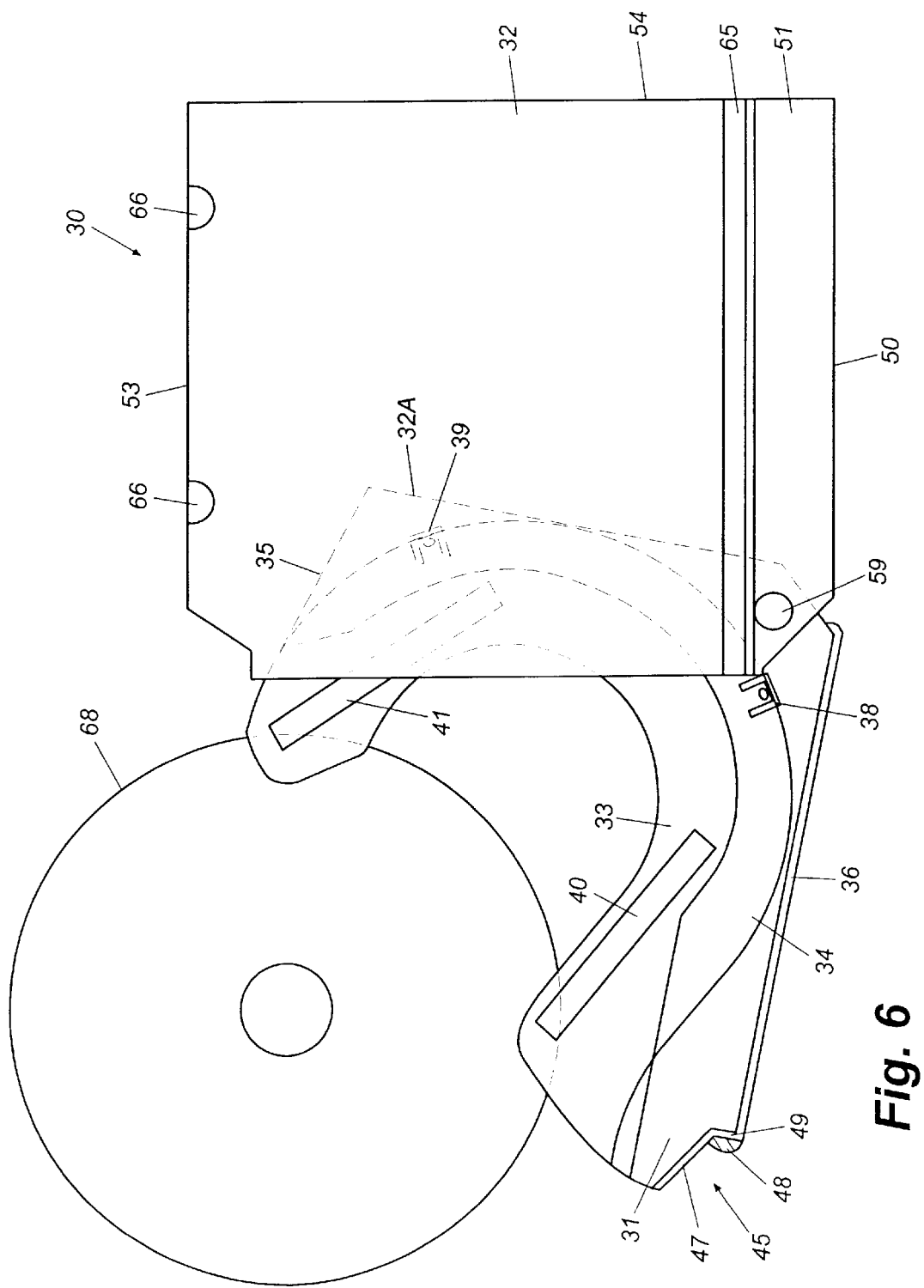
FIG. 6 is a lateral plan view of the jewel case of FIG. 3 with the storage cradle rotated forward to provide access to either remove or insert the disc to be stored.

Referring to FIGS. 1 and 2, a storage cradle for compact discs according to the present invention is generally indicated at 1. Each cradle 1 consists of a base 2 having generally parallel vertically upstanding side walls 3 and 4, a rear wall 5 and a vertical upstanding front wall 6. One of said side walls 3 is higher than the other side wall 4 so that it acts as a guide when returning the disc into the slot 7 formed between the two side walls 3 and 4. The slot 7 or distance between the side walls 3 and 4 is sized to accommodate the thickness of an individual compact disc being stored. Means are provided on each of said side walls 3 and 4 to keep the disc centered when fully inserted into the cradle. In the embodiments illustrated in FIGS. 1 and 2 there are two indented plastic tabs 8 and 9 on the side wall 4 adjacent the bottom of the slot 7 that grip the unreadable outer edge of the discs to keep the disc centered when fully inserted into the cradle. The wider side 3 of the cradle also has two protective strips of felt 10 and 11 to ensure that the readable side of the compact disc is not scratched when removing and replacing the discs. The top edge 18 an 19 of both of walls 3 and 4 are generally C-shaped to permit easy access to the disc (shown by the circular dotted line in FIGS. 1 and 2)

An indexed storage cradle system for individual indexed cradles 1 so that the operator can store and retrieve any compact disc without touching the laser readable surface of the compact disc according to the present invention can be provided in accordance with the present invention. The storage cradle system of the preferred embodiment holds up to 200 discs in individual indexed cradles of FIGS. 1 and 2 so that the operator can store and retrieve any compact disc without touching the laser readable surface of the compact disc. The storage cradle system consists of a housing onto which a series of cradles as shown in FIGS. 1 and 2 are rotatably mounted in parallel. Each cradle 1 is provided with a hole 12 through the side walls 3 and 4 adjacent the front wall 6 and above base 2. A solid steel rod is inserted through the holes 12 on each cradle. The rod is then mounted to the side walls of the housing. The cradles can rotate around the rod to permit the discs to be inserted and removed from the slot 7. To facilitate the rotation or pivoting of the cradles that portion 13 of the front wall 6 adjacent base 2 is angled. When opened fully (i.e. rotated forward), the cradle rests on neoprene rubber for further protection. A spacer is preferably placed between adjacent cradles in order that they will not bind against the adjacent cradle when retrieving or retracting discs from the unit. In the preferred embodiment the spacer 14 consists of a washer around the outside of hole 12 on side wall 3. The spacer can be formed integrally with the cradle.

In order to facilitate the pivoting of the cradles means are provided on the top 15 and 16 of the front wall 6 of each of the cradles of FIGS. 1 and 2. The top 15 of the front wall 6 of the cradle in FIG. 1 is provided with a cutout portion 17. A tab 18 is provided on the bottom 19 of said cutout to facilitate pulling down the cradle. The top 16 of the front wall 6 of the cradle of FIG. 2 is also provided with a cutout portion 20. A tab 21 is provided on the top 22 of said cutout to facilitate pulling down the cradle. As noted above the cradle of FIG. 1 and the cradle of FIG. 2 are alternatively placed on the rod. The location of the tabs 18 and 21 alternate on adjacent cradles to minimize the chance of inadvertently pulling down the adjacent cradle.

The housing for the cradles preferably consists of a rectangular box with a detachable or hinged cover. A handle is provided on the top of the box. The inserts that were contained in the original plastic case with the compact disc are placed in plastic sleeves in a binder. The binder is cross referenced to the indexed cradle number in the storage system. The index number is preferably placed above the cradle.

Incorporation of the storage cradle of the present invention within a jewel case is shown in FIGS. 3 to 6. The jewel case 30 of the present invention consists of a storage cradle, generally indicated at 31 pivotally mounted within a housing 32. The cradle 31 consists of a base 32A having generally parallel vertically upstanding side walls 33 and 34, a rear wall 35 and a vertical upstanding front wall 36. One of said side walls 33 is higher than the other side wall 34 so that it acts as a guide when returning the disc into the slot 37 formed between the two side walls 33 and 34. The slot 37 or distance between the side walls 33 and 34 is sized to accommodate the thickness of an individual compact disc being stored. Means are provided on each of said side walls 33 and 34 to keep the disc centered when fully inserted into the cradle. In the embodiments illustrated in FIGS. 3 to 6 there are two indented plastic tabs 38 and 39 on the side wall 34 adjacent the bottom of the slot 37 that grip the unreadable outer edge of the discs to keep the disc centered when fully inserted into the cradle. The wider side 33 of the cradle also has two protective strips of felt 40 and 41 to ensure that the readable side of the compact disc is not scratched when removing and replacing the discs. The top edge 33A and 34A of both of walls 33 and 34 are generally C-shaped to permit easy access to the disc. (shown by the shaded outline in FIG. 3, 4 and 6).

In order to facilitate the pivoting of the cradles means are provided on the top 45 of the front wall 36 of the cradle 31. The top 45 of the front wall 36 of the cradle is provided with a rewardly inclined portion 47. A tab 48 is provided on the bottom 49 of said inclined portion to facilitate pulling down the cradle.

The housing 32 is generally rectangular with a base wall 50 having generally parallel side walls 51 and 52, a top wall 53 and rear wall 54. The side walls 51 and 52 extend beyond the front edge 55 of the base 50 and the front edge 56 of the top wall 53. In the preferred embodiment illustrated in FIGS. 3 to 6, a bottom portion 57 and 58 of the side walls is removed at approximately a 45° angle to facilitate rotation of the cradle 31 from the open to the closed position and vice versa. The hole 59 in cradle 31 permits the cradle 31 to pivot on axle 60. In order to insert axle 60 within hole 59 the housing is preferably a two part design with the halves 61 and 62 being fastened together by glue, thermal welding, snap fit or other suitable method.

In the preferred embodiment illustrated in FIGS. 3 to 6, a top portion 63 and 64 of the side walls is removed at the same angle as the inclined portion 47 of the top 45 of the front wall 36 of the cradle. As noted above a tab 48 is provided on the bottom 49 of said inclined portion 47 to facilitate rotating the cradle 31 from the open to the closed position and vice versa. The tab 48 can be ribbed to provide easier use. The side wall 52 is provide with a upward opening channel 65 adjacent its lower edge above axle 60. This channel together with tabs 66 depending from the top wall 53 are located to retain a CD booklet as typically accompanies CD 68. The front face 67 of front wall 36 of cradle 31 can accept a CD identification label.

The use of the rotating cradle within the jewel case allows a user to leave the case on its storage shelf and with one hand access and remove the stored CD. One hand access provides a number of advantages including safety when accessed in an automobile and increase jewel case longevity. The jewel case of the present invention provides trouble free access to the CD by the tilting action of the cradle from a single point of rotation. The jewel case of the present invention is preferably the same size as existing conventional jewel cases and can therefore be accommodated in existing CD storage units.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which and exclusive property or privilege is claimed are defined as follows:

1. An improved storage cradle for compact discs comprising a base having vertically upstanding side walls, a rear wall and a vertical upstanding front wall, one of said side walls is higher than the other to act as a guide when inserting the disc into a slot formed between the two side walls and two indented tabs on one of said side walls adjacent the bottom of said slot that grip the unreadable outer edge of the discs to keep the disc centered when fully inserted into the cradle.

2. An improved storage cradle according to claim 1 wherein the other side wall of the cradle is provided with two protective strips of felt to ensure that the readable side of the compact disc is not scratched when removing and replacing the discs.

3. An improved storage cradle according to claim 1 wherein the top edge of both of said side walls is generally C-shaped to permit easy access to the disc.

4. An indexed storage cradle system for compact discs comprising a series of storage cradles rotatably mounted in parallel in a housing, each cradle comprising a base having generally parallel vertically upstanding side walls, a rear wall and a vertical upstanding front wall, one of said side walls is higher than the other to act as a guide when inserting the disc into a slot formed between the two side walls, two indented tabs on one of said side walls adjacent the bottom of said slot that grip the unreadable outer edge of the discs to keep the disc centered when fully inserted into the cradle, the top of the front wall of each cradle is provided with a cutout portion, a tab is provided either on the bottom or the top of said cutout to facilitate pulling down the cradle and the location of the tab alternates on adjacent cradles to minimize the chance of inadvertently pulling down the adjacent cradle.

5. A case for the storage of compact discs comprising a storage cradle, pivotally mounted within a housing; said cradle comprising a base having vertically upstanding side walls, a rear wall and a vertical upstanding front wall, wherein one of said side walls is higher than the other side wall so that it acts as a guide when returning the disc into a slot formed between the two side walls; two indented tabs on one of said side walls that grip the unreadable outer edge of said discs; and said housing is generally rectangular with a base wall having generally parallel side walls, a top wall and rear wall.

6. A case according to claim 5 wherein the side walls extend beyond the front edge of the base and the front edge of the top wall.

7. A case according to claim 6 wherein a bottom portion of the side walls is removed at approximately a 45° angle to facilitate rotation of the cradle from the open to the closed position and vice versa.

8. A case according to claim 5 wherein said slot or distance between the side walls is sized to accommodate the thickness of an individual compact disc being stored.

9. A case according to claim 8 wherein the top edges of both of said side walls are generally C-shaped to permit easy access to the disc.

10. A case according to claim 8 wherein two indented tabs are provided on said side walls to keep the disc centered when fully inserted into the cradle.

11. A case according to claim 10 further comprising one or more protective strips on one of said walls to ensure that the readable side of the compact disc is not scratched when removing and replacing the discs.

12. A case according to claim 11 wherein means are provided on the top of the front wall of the cradle in order to facilitate the pivoting of the cradles.

13. A case according to claim 12 wherein the top of the front wall of the cradle is provided with a rearwardly inclined portion and a tab is provided on the bottom of said inclined portion to facilitate rotating the cradle.

14. A case according to claim 12 wherein a top portion of the side walls is removed at the same angle as the inclined portion of the top of the front wall of the cradle.

15. A case according to claim 5 wherein a hole is provided in said cradle to permit the cradle to pivot on an axle within said housing.

16. A case according to claim 15 wherein said housing is a two part design.

17. A case according to claim 5 wherein one of said side walls is provided with an upward opening channel adjacent its lower edge, said channel together with tabs depending from the top wall of said housing adapted to retain a CD booklet within said housing.

18. A case according to claim 5 wherein the front face of the front wall of said cradle is sized to accept a CD identification label.

* * * * *